United States Patent [19]
Gould et al.

[11] Patent Number: 4,523,046
[45] Date of Patent: Jun. 11, 1985

[54] METHOD FOR GASOLINE YIELD ENHANCEMENT IN THE FIXED BED METHANOL-TO-GASOLINE PROCESS

[75] Inventors: Ronald M. Gould, Sewell, N.J.; Sergei Yurchak, Media, Pa.

[73] Assignee: Mobil Oil Corporation, New York, N.Y.

[21] Appl. No.: 352,417

[22] Filed: Feb. 25, 1982

[51] Int. Cl.³ .............................................. C07C 1/04
[52] U.S. Cl. ................................... 585/322; 585/324; 585/408; 585/640; 585/733
[58] Field of Search ............... 585/322, 324, 469, 639, 585/640

[56] References Cited
U.S. PATENT DOCUMENTS

| 2,299,197 | 10/1942 | West | 422/200 |
|---|---|---|---|
| 4,035,430 | 7/1977 | Dwyer et al. | 585/322 |
| 4,052,479 | 10/1977 | Chang et al. | 585/640 |
| 4,058,576 | 11/1977 | Chang et al. | 585/322 |
| 4,150,062 | 4/1979 | Garwood et al. | 585/415 |
| 4,231,899 | 11/1980 | Chen et al. | 585/469 |
| 4,326,994 | 4/1982 | Haag et al. | 502/77 |
| 4,418,235 | 9/1983 | Haag et al. | 502/77 |
| 4,423,266 | 12/1983 | Young | 585/481 |

Primary Examiner—Delbert E. Gantz
Assistant Examiner—A. Pal
Attorney, Agent, or Firm—A. J. McKillop; M. G. Gilman; J. F. Powers, Jr.

[57] ABSTRACT

Gasoline product yield is enhanced in a fixed bed methanol-to-gasoline process by splitting the conversion reactor into a series of smaller conversion reactors such that the total amount of catalyst normally present in the single conversion reactor is present in equal quantities in the smaller conversion reactors. The smaller conversion reactors operate sequentially with the next conversion reactor beginning operation only when the preceeding conversion reactor is catalytically exhausted. The by-passing of one or more of the catalyst beds prevents premature deactivation of the catalyst beds downstream of the point at which the reaction products are removed.

10 Claims, 2 Drawing Figures

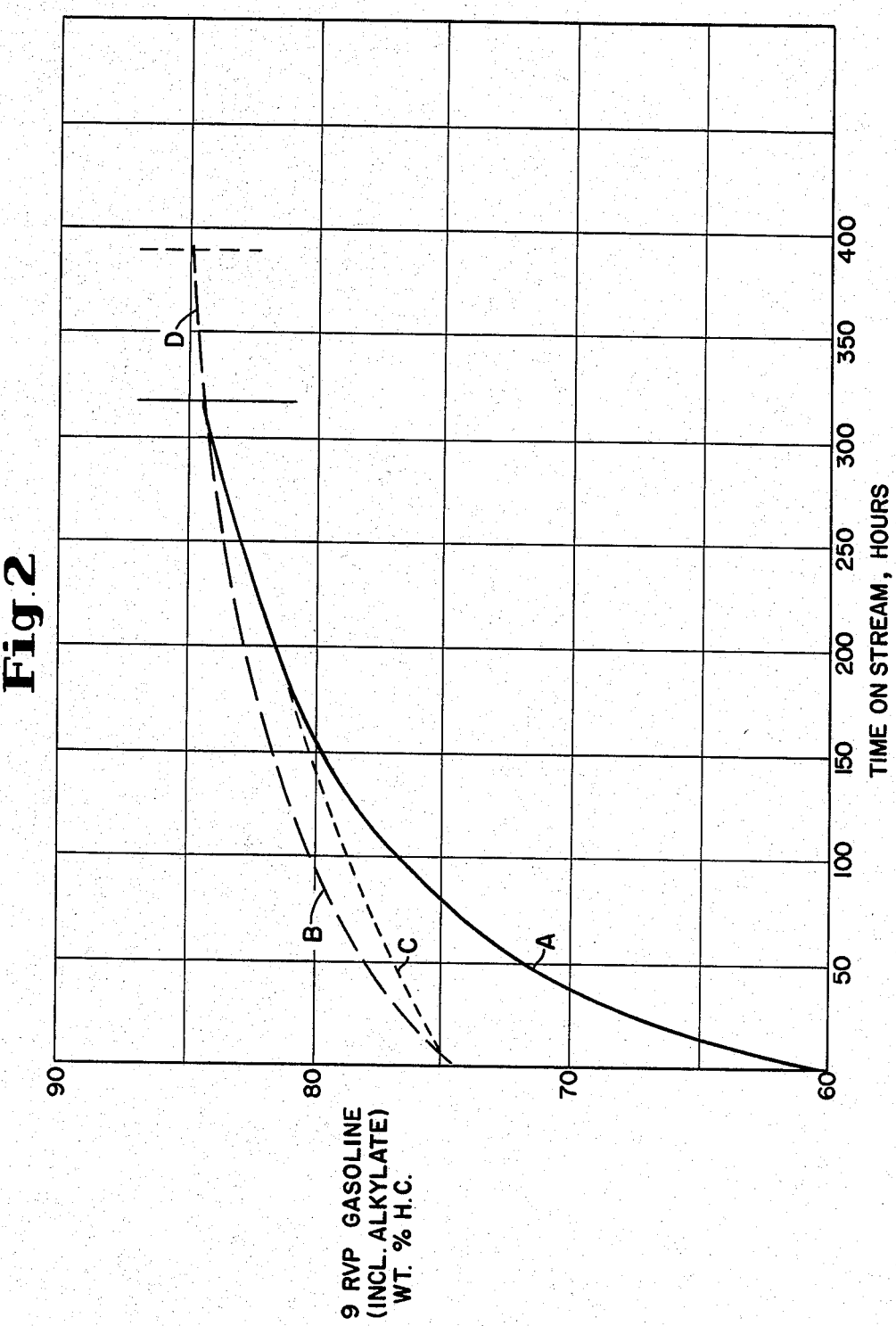

METHOD FOR GASOLINE YIELD ENHANCEMENT IN THE FIXED BED METHANOL-TO-GASOLINE PROCESS

BACKGROUND OF THE INVENTION

1. Field of the Invention

This invention relates generally to the conversion of methanol so as to produce gasoline boiling-range hydrocarbons and, more particularly, to a process for maximizing gasoline production and minimizing catalyst deactivation by splitting the conversion reactor into a series of smaller units.

2. Description of the Prior Art

The conversion of methanol-to-gasoline boiling-range hydrocarbons is well known in the prior art. A conventional methanol-to-gasoline system, as disclosed in U.S. Pat. No. 3,928,483 (Chang et al) dated Dec. 23, 1975, consists of two or more reactors in a series. Generally, in the condensation reactor stage methanol is reacted over a condensation catalyst to produce a reaction product containing aliphatic dehydration products and water. In the conversion stage a portion of the reaction products of the first stage are contacted with a crystalline aluminosilicate zeolite catalyst to convert the reaction products to gasoline range hydrocarbons.

U.S. Pat. No. 3,931,349 (Kuo) dated Jan. 6, 1976, discloses a two stage process for converting methanol-to-gasoline where the exothermic temperature rise in the first stage is catalytically restricted and a heat dissipating diluent is employed in the second stage.

U.S. Pat. No. 3,998,899 (Daviduk et al) dated Dec. 21, 1976, shows a process for passing methanol through a plurality of catalyst contact zones which are temperature restrained in response to catalyst activity and selectivity.

U.S. Pat. No. 4,083,889 (Caesar et al) dated Apr. 11, 1978, shows a method for converting methanol-to-ethylene in the presence of steam and a ZSM-5 catalyst at a temperature of about 600° to about 750° F.

U.S. Pat. No. 4,035,430 (Dwyer et al) dated July 12, 1977, discloses a method of converting methanol-to-gasoline boiling products in a plurality of sequentially arranged catalyst beds. One catalyst bed contains a calcined alumina which dehydrates the methanol charge to produce a dimethyl ether product, unconverted methanol, and water. Dimethyl ether is passed through a second series of catalyst contact zones comprising a plurality of catalyst beds in a single reactor.

U.S. Pat. No. 4,049,734 (Garwood et al) dated Sept. 20, 1977, discloses a two step process for methanol conversion where synthesis gas is converted in a first stage to a product comprising methanol. Methanol is then converted to an aromatic gasoline product over a zeolite catalyst at a temperature of about 500°–1200° F.

U.S. Pat. No. 4,058,576 (Chang et al) dated Nov. 15, 1977, discloses a multiple stage catalyst process for converting methanol to olefins and/or gasoline boiling components. The reaction stages proceed through methanol conversion to dimethyl ether, ether conversion to olefins, and conversion of olefins to gasoline boiling components.

U.S. Pat. No. 4,138,442 (Chang et al) dated Feb. 6, 1979, discloses a process where methanol is reacted with a zeolite catalyst to produce a product which is resolved into a high octane gasoline fraction and other products.

U.S. Pat. No. 4,263,141 (Möller) dated Apr. 21, 1981, discloses a methanol-to-gasoline step process wherein the methanol is catalytically converted into gasoline hydrocarbons. The reaction takes place over known zeolite catalysts and the gasoline synthesis stage may consist of one or more tubular reactors.

In conventional conversion reactor systems most of the methanol conversion occurs in the upstream one-third to one-half of the catalyst bed. Under standard reactor conditions of high temperature and high pressure, water in the form of steam which results from the conversion process and from water occurring naturally in the feed flows throughout the catalyst bed deactivating the catalyst. Unlike coking-type deactivation where the catalyst can be regenerated by burning off the coke, steam deactivation is permanent and the catalyst activity is not recoverable. Therefore, it is an object of this invention to produce an improved methanol-to-gasoline conversion process wherein the downstream portion of the catalyst bed is not prematurely and permanently deactivated by steam. The advantages of such an invention are particularly apparent from an economic point of view. By preventing the catalyst from becoming prematurely deactivated, the reactor will operate far more efficiently and economically; and reactor shut down rate will be drastically reduced as well as the man hours required in replacing the permanently deactivated catalyst.

SUMMARY OF THE INVENTION

This invention improves upon the methanol-to-gasoline conversion process by separating the conversion reactor bed into a series of smaller units such that the conversion can be accomplished completely in the first reactor thereby preventing premature deactivation of the catalyst beds downstream of the point at which the reaction products are removed. The gasoline synthesis zones are arranged so that gasoline production is maximized and catalyst deactivation is minimized. The cooling of the reactor is accomplished by recirculating light hydrocarbon product gas back to the reactor inlet. The volume of catalyst used in the present invention is the same as in a conventional methanol-to-gasoline conversion process. The present system can incorporate more than two conversion reactors in series.

BRIEF DESCRIPTION OF THE DRAWINGS

FIG. 2 is a graph showing the improvement in gasoline yield for divided reactor operation over undivided reactor operation.

DETAILED DESCRIPTION OF THE INVENTION

Figure 1:
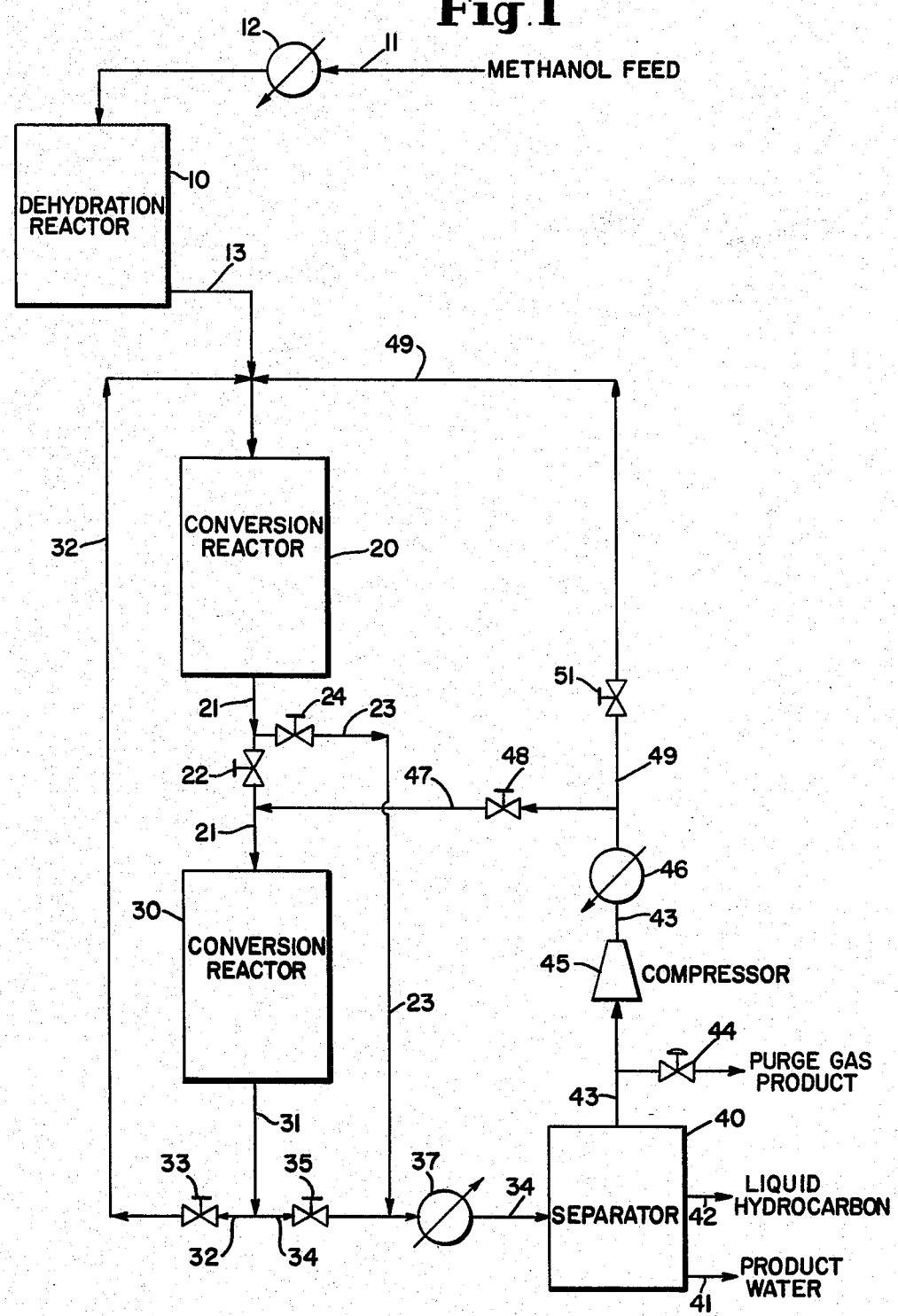
FIG. 1 is a schematic flow sheet showing a preferred embodiment in which the conversion reactor is divided into two reactors of equal volume.

The improvement over the prior art is set forth in a multiple reactor methanol-to-gasoline system. The lower alcohols which may be charged to the process of this invention consists principally of relatively pure single alcohols or mixtures of alcohols with other components such as higher alcohols. Examples include methanol, ethanol, propanol and isopropanol. Such alcohols generally result from prior gasification and methanol synthesis steps which may be integrated with the methanol-to-gasoline process. It is understood that no more than trace amounts of the synthesis gas product of the prior gasification step may be fed to the improved methanol-to-gasoline process.

The improved methanol-to-gasoline system consists of at least three reactors in a series. In the first reactor, the dehydration reactor, methanol is converted to an equilibrium mixture of methanol, dimethyl ether and water. These products are generally mixed with light hydrocarbon recycle gas and fed into the second system of reactors, the conversion reactor, where the combined feed is converted into gasoline range hydrocarbons.

In the first stage of the present invention, the dehydration stage, the alcohol reactant is contacted with a condensation catalyst to produce water and predominantly aliphatic organic intermediate products. The preferred alcohol reactants to this first stage are ethanol and methanol. Particularly preferred are charges comprising a substantial fraction, i.e. more than 25 weight percent, of methanol. The condensation catalyst may be any catalyst which results in the intermolecular dehydration of the alcohol reactant to form an aliphatic product of higher carbon to oxygen ratio than the feed. While the dehydration reaction by itself is generally run with alumina compositions such as gamma alumina, it is noted that other acidic catalysts known in the art are very effective for the conversion. Such catalysts include by way of example, liquid acids such as sulfuric and phosphoric acids, and solid inorganic and organic acidic catalysts such as phosphoric acids supported by kieselguhr, high surface area silica-alumina, acidic alumina, acid treated clays, bauxites, and polystyrene sulfonic acids of the ion-exchange type including macroreticular variety. For the purpose of this invention, it is preferred to use solid acidic catalysts.

The first stage reaction effluent mixture thus formed exits this stage at a temperature of 700°–800° F. This effluent is then mixed with $C_5$ and lighter hydrocarbons prior to its passage into the second stage catalytic zone.

The second stage catalytic conversion operation of this invention is particularly restricted to converting the first stage effluent mixture comprising methanol, dimethyl ether and water to an olefin rich product material and/or a product rich in gasoline boiling components. The operation is highly exothermic and occurs rapidly in the presence of selected crystalline zeolites and particularly catalysts comprising ZSM-5 type crystalline zeolites. ZSM-5 type crystalline zeolites are disclosed in U.S. Pat. No. 3,702,886 (Argauer) dated Nov. 14, 1972, and U.S. Pat. No. 4,100,262 (Pelrine) dated July 11, 1978, and are hereby incorporated by reference. The effluent is mixed with a diluent material, preferably $C_5$ and lighter hydrocarbons, in an amount sufficient to act as the heat carrier and provide a mixture at a temperature of about 600°–750° F. which is a desired inlet temperature for completing the conversion of the effluent as well as the unconverted methanol by contact with the crystalline zeolite ZSM-5 catalyst. The crystalline zeolite conversion operation is maintained at a pressure within the range of 15–400 psig. A reasonable temperature increase across the ZSM-5 reactor is estimated to be in the range of 50° F. to about 250° F.

In accordance with this invention, the further conversion of the first stage effluent mixture is accomplished in fixed bed catalyst-containing reactors which comprise two or more smaller reactor beds or units connected in series.

The size of each reactor bed depends directly on the number of units incorporated into the conversion reactor. For example, if two reactor beds make up the conversion reactor system, then each bed is approximately one-half the size of a conventional reactor bed. In addition to the size of the individual reactor beds, the amount of catalyst in each bed is directly related to the number of units in the reactor system. As in the example above, each bed of a two reactor bed system will contain in equal amounts approximately one-half of the total amount of the catalyst incorporated into the system. Thus, the total amount of catalyst in the multi-bed conversion reactor is substantially equal to the amount of catalyst in the conventional single bed reactor system.

A novel aspect of this invention lies in the sequential arrangement of each reactor bed unit. Operation of this arrangement is in series. Process piping isolates the other reactor beds from the first reactor bed of the second stage allowing the first stage effluent mixture to enter the first reactor bed of the second stage. The effluent mixture is then allowed to be fully converted in a conventional manner in the first reactor bed of the second stage until such time as the catalyst has deactivated to the extent that unconverted methanol begins to exit from the conversion reactor bed. At this point the process piping connecting each reactor bed is altered thus allowing the effluent mixture to pass through the initial reactor bed and enter a subsequent reactor bed. In this manner the effluent mixture enters the initial reactor bed where it is partially converted. The partially converted effluent then enters a subsequent reactor bed for full conversion until, as hereinbefore described, unconverted methanol is discovered exiting the conversion reactor bed.

This system continues until there are no more reactor beds at which point the conversion reactor system is shut down and the deactivated catalyst is regenerated by a controlled dilute oxygen burn.

The effluent from the second stage conversion is cooled by indirect heat exchange means to a temperature within the range of 80°–200° F. The cooled effluent then enters a high pressure separation unit where the effluent separates into three phases: (1) a liquid hydrocarbon phase which contains most of the gasoline product, (2) a gaseous phase consisting of primarily light hydrocarbons, and (3) an aqueous phase.

Most of the light hydrocarbon gas is recycled, mixed with the effluent from the dehydration reactor and fed into the conversion reactor where the combined feed is converted into gasoline range hydrocarbons. In addition, the recirculating light hydrocarbon gas serves as a heat dissipating temperature control mechanism to maintain the catalyst conversion zone in a proper state. The light hydrocarbon gases thus employed are easily separated from the higher boiling gasoline components as described in U.S. Pat. No. 4,035,430 hereby incorporated by reference.

The multi-stage fixed catalyst bed processing combination of this invention offers several significant advantages for the conversion of methanol-to-gasoline boiling components. For example, the cycle length and gasoline yield of methanol-to-gasoline conversion catalyst are increased by carrying out the conversion of an equilibrium mixture of methanol, dimethyl ether and water in an improved reactor system that consists of two or more equal-volume reactors connected in series. Most significantly, the permanent deactivation rate of the second stage catalyst is reduced by the proposed reactor system, thereby allowing a longer catalyst ultimate life to be attained. These advantages are achievable in this modified process without the need for interstage cooling in the conversion reactors.

DESCRIPTION OF THE PREFERRED EMBODIMENTS

The preferred embodiments of the invention will be described with reference to the accompanying drawing.

Referring to FIG. 1, methanol passes in line 11 through heat exchanger 12 and enters dehydration reactor 10 operating at an inlet temperature of 550°–650° F. and a pressure of 200–400 psig. The methanol is converted into an equilibrium mixture of methanol, dimethyl ether, and water. The effluent mixture exits line 13 and mixes with light hydrocarbon recycled gas from line 32.

Operation of conversion reactor 20 and 30 is cyclic. For simplicity, operation of the cycle for reactors 20 and 30 will be described for the preferred embodiment in which reactors 20 and 30 are of equal volume, containing equal quantities of a catalyst of which the total quantity is kept constant. The description of the preferred embodiments begins at the start of a process cycle in which process piping is altered to allow either isolation of downstream reactor 30 or by-passing of downstream reactor 30 with respect to effluent in line 13 from dehydration reactor 10 during the early stage of a process cycle. This early stage ends when methanol appears in the effluent from conversion reactor 20, termed "methanol break-through".

At the beginning of the cycle, valves 24, 33 and 48 are opened while valves 22, 35 and 51 are closed, thus isolating conversion reactor 30 from effluent. The combined stream from lines 13 and 32 enters isolated conversion reactor 20 at line 13 whereupon the combined stream is completely converted into a gasoline-range hydrocarbon effluent emerging from reactor 20 at line 21. Since valve 22 is initially closed, the effluent from line 21 diverts to line 23 and through open valve 24. The effluent stream passes through line 23 to line 34 entering heat exchanger 37 where it is cooled. The cooled effluent then enters high pressure separation unit 40 which separates the effluent into liquid water exiting at line 41, gasoline range hydrocarbons exiting at line 42 and light hydrocarbon gas exiting at line 43. The light hydrocarbon gas can be partially tapped off at line 44 in the form of a hydrocarbon gas product. The remainder light hydrocarbon gas follows line 43 through compressor 45 and heat exchanger 46. The gas then enters conversion reactor 30 via lines 47 and 21, thus maintaining the temperature of the catalyst bed in conversion reactor 30 at approximately 600°–750° F. The gas then flows from conversion reactor 30 through lines 31 and 32 to line 13 where it is combined with the effluent from methanol dehydration reactor 10. Operation in this mode continues until methanol is detected in the conversion reactor effluent at line 21.

When conversion reactor 20 can no longer accomplish 100% conversion of methanol, valves 24, 33 and 48 are closed and valves 22, 35 and 51 are opened allowing methanol from line 13 and recycled gas from line 49 to pass through conversion reactor 20, where it is only partially converted due to the deactivated state of the catalyst, to line 21. The partially converted hydrocarbon effluent passes through open valve 22 and enters conversion reactor 30 to achieve complete conversion of methanol. The converted methanol exits conversion reactor 30 at line 31. The effluent passes through heat exchanger 37 via line 34 and enters separation unit 40 wherein it is again separated into liquid water, gasoline range hydrocarbons, and light hydrocarbon gas. The light hydrocarbon gas exits separation unit 40 at line 43 and passes through compressor 45 and heat exchanger 46 to line 49 and combines with the effluent from methanol dehydration reactor 10 at line 13.

The cycle continues until methanol is detected in line 31. At this point, if only conversion reactors 20 and 30 are in operation, the system is shut down while the deactivated catalyst is regenerated. If, however, a plurality of reactors 20 and 30 are available, the process piping is altered to shut down one sequential pair of reactors 20 and 30 at a time while the remainder continue in operation.

FIG. 2 shows some of the advantages of the modified cyclic process over the unmodified process. The product stream tested is 9 RVP gasoline. Curve A indicates gasoline yield (Weight percent) as a function of time for the unmodified process during the first cycle. Curve B estimates gasoline yield for the modified cyclic process wherein the conversion reactor has been divided into two equal volume reactors connected in series. The total quantity of conversion catalyst in each reactor system is identical. Curve C is a conservative estimate of gasoline yield for the modified process. The information from FIG. 2 shows that the estimated average gasoline yield for the modified cyclic system is between 81 and 82 weight percent compared to 78% for the unmodified system. In addition, the cycle length of the modified system is extended (D). The increased cycle length is due in part to the extended ultimate catalyst life in the modified system. By splitting the conversion reactor into smaller units operating cyclically, the steam which results from methanol conversion and water naturally occurring in the feed methanol has no opportunity to prematurely deactivate the catalyst in the isolated reactor beds of the second stage. This is because these beds have only light hydrocarbon recycle gas flowing through them. This recycle gas contains only a very small quantity of water vapor which is determined by the conditions of the high pressure separator.

What is claimed is:

1. In a process for the conversion of methanol to gasoline boiling range components which comprises passing a methanol feed through a heat exchanger means and a dehydration reactor means for conversion of said methanol feed to a dehydration product comprising methanol, dimethyl ether and water, and passing said dehydration product through a single fixed catalyst bed so as to completely convert said dehydration product to a product rich in gasoline boiling components, the improvement which comprises; dividing said fixed catalyst bed into a plurality of separate fixed catalyst beds comprising a first reactor bed and at least one downstream reactor bed, passing said dehydration product through said first reactor bed to complete conversion of said dehydration product therein and produce an effluent comprising said gasoline-rich product, continuing to complete conversion of dehydration product passing through said first reactor bed and by-passing said downstream reactor beds until such time as there is a predetermined decline of said complete conversion of said dehydration product whereupon said dehydration product is passed through said first reactor bed and said effluent comprising partially converted dehydration product passes from said first reactor bed to said downstream reactor bed to yield said complete conversion, continuing complete conversion and placing subsequent downstream reactor beds in service only upon such time as said predetermined decline of complete conversion in an immediately preceeding downstream reactor bed is detected until the final reactor bed of said plurality of separate catalyst beds is placed in service, whereby gasoline yields and cycle lengths from conversion in said divided fixed catalyst bed is improved over said single fixed catalyst bed at equivalent conversion conditions.

2. The process of claim 1 wherein said methanol feed comprises methanol, ethanol, propanol, and isopropanol.

3. The process of claim 2 wherein said methanol feed is in admixture with higher alcohols.

4. The process of claim 1 wherein said separate fixed catalyst beds contain equivalent measures of said catalyst.

5. The process of claim 4 wherein said catalyst is selected from the class of zeolites represented by ZSM-5 crystalline zeolite.

6. The process of claim 5 wherein said catalyst is ZSM-5.

7. The process of claim 1 wherein the predetermined decline of complete conversion is determined by the appearance of substantial amounts of said methanol feed in the effluent of said reactor bed.

8. The process of claim 1 wherein said plurality of fixed catalyst beds are separated by valves.

9. The process of claim 1 wherein said operating conversion reactor is maintained at a temperature of about 600° F. to about 950° F.

10. The process of claim 1 including passing said effluent from said final reactor bed through a heat exchanger and a separator zone to produce liquid water, gasoline range hydrocarbon products and light hydrocarbon gas, and recycling a portion of said light hydrocarbon gas through said plurality of separate fixed catalyst beds.

* * * * *